US012626849B2

(12) United States Patent
Ishida

(10) Patent No.: US 12,626,849 B2
(45) Date of Patent: *May 12, 2026

(54) COIL COMPONENT

(71) Applicant: Murata Manufacturing Co., Ltd., Kyoto-fu (JP)

(72) Inventor: Keiichi Ishida, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 641 days.

This patent is subject to a terminal disclaimer.

(21) Appl. No.: 18/189,725

(22) Filed: Mar. 24, 2023

(65) Prior Publication Data

US 2023/0326650 A1 Oct. 12, 2023

(30) Foreign Application Priority Data

Mar. 29, 2022 (JP) ................................ 2022-054179

(51) Int. Cl.
*H01F 27/02* (2006.01)
*H01F 1/20* (2006.01)
(Continued)

(52) U.S. Cl.
CPC ............ *H01F 27/022* (2013.01); *H01F 1/20* (2013.01); *H01F 1/342* (2013.01); *H01F 27/292* (2013.01); *H01F 27/32* (2013.01); *H01F 41/12* (2013.01)

(58) Field of Classification Search
CPC .......... H01F 27/022; H01F 1/20; H01F 1/342; H01F 27/292; H01F 27/32; H01F 41/12; H01F 1/33; H01F 2017/048; H01F 27/2852; H01F 1/26; H01F 17/04; H01F 27/255; H01F 27/34; H01F 2027/348
(Continued)

(56) References Cited

U.S. PATENT DOCUMENTS 4,775,598 A 10/1988 Jaeckel
2013/0228716 A1* 9/2013 Suetsuna .................. H01F 1/24 427/127
(Continued)

FOREIGN PATENT DOCUMENTS

JP S63-149306 A 6/1988
JP 2007-142369 A 6/2007
(Continued)

*Primary Examiner* — Kenneth Whittington
(74) *Attorney, Agent, or Firm* — Studebaker Brackett PLLC

(57) ABSTRACT

A coil component includes an element assembly including a coil conductor formed by winding a conductor coated with an electrically insulating film and a magnetic portion containing metal magnetic particles and resin, and an outer electrode electrically connected to an exposed surface of an extended part of the coil conductor, exposed on a surface of the element assembly and disposed on the surface of the element assembly. The metal magnetic particles include first and second metal magnetic particles. A particle size distribution of the metal magnetic particles, calculated in accordance with a circle equivalent diameter obtained from a cross-sectional image in a cross section of the magnetic portion, has at least two peaks and at least one bottom. The large magnetic particles are larger than or equal to the bottom having a minimum frequency.

20 Claims, 9 Drawing Sheets

IV-IV CROSS-SECTIONAL VIEW

(51) Int. Cl.

| | |
|---|---|
| ***H01F 1/34*** | (2006.01) |
| ***H01F 27/29*** | (2006.01) |
| ***H01F 27/32*** | (2006.01) |
| ***H01F 41/12*** | (2006.01) |

(58) Field of Classification Search
USPC .......................................................... 336/233
See application file for complete search history.

(56) References Cited

U.S. PATENT DOCUMENTS

| | | | | |
|---|---|---|---|---|
| 2018/0204657 | A1* | 7/2018 | Shinkai | B22F 1/105 |
| 2019/0392978 | A1* | 12/2019 | Matsuura | H01F 17/04 |
| 2022/0262563 | A1* | 8/2022 | Arai | H01F 1/26 |

FOREIGN PATENT DOCUMENTS

| | | | |
|---|---|---|---|
| JP | 2007-234894 | A | 9/2007 |
| JP | 2013-239542 | A | 11/2013 |
| JP | 2014-063923 | A | 4/2014 |
| JP | 2016-039331 | A | 3/2016 |
| JP | 2016-526108 | A | 9/2016 |
| JP | 2016-526109 | A | 9/2016 |
| JP | 2016-527388 | A | 9/2016 |
| JP | 2017-022148 | A | 1/2017 |
| JP | 2018-529840 | A | 10/2018 |
| JP | 2020-155637 | A | 9/2020 |
| JP | 2021-52075 | * | 4/2021 |
| JP | 2021-158343 | A | 10/2021 |
| JP | 2023-146793 | A | 10/2023 |
| WO | 2014/196785 | A1 | 12/2014 |
| WO | 2014/196786 | A1 | 12/2014 |
| WO | 2014/196806 | A1 | 12/2014 |
| WO | 2017/027915 | A1 | 2/2017 |

* cited by examiner

III-III CROSS-SECTIONAL VIEW

IV-IV CROSS-SECTIONAL VIEW

COIL COMPONENT

CROSS-REFERENCE TO RELATED APPLICATION

This application claims benefit of priority to Japanese Patent Application No. 2022-054179, filed Mar. 29, 2022, the entire content of which is incorporated herein by reference.

BACKGROUND

Technical Field

The present disclosure relates to a coil component.

Background Art

As an existing coil component (reactor), a main body portion of the coil component is made up of a magnetic core and a coil. The magnetic core is made of a composite material obtained by mixing metal magnetic particles with resin. The composite material of the magnetic core is manufactured from a soft magnetic composite material.

The soft magnetic composite material according to an existing technology has such a drawback that the magnetic permeability is low and, as a result, the inductance of a reactor manufactured from the soft magnetic composite material is low. In the existing technology, a method is configured to mix metal magnetic particles with resin in advance and then to form the mixed material into a designated shape. Therefore, there is a drawback that the amount of resin used to the amount of metal magnetic particles used increases. This leads to a decrease in the magnetic permeability of the obtained soft magnetic composite material, with the result that direct-current superposition characteristics undesirably deteriorate due to a decrease in density.

For this reason, there has been suggested a technology for making it possible to increase the density of obtained soft magnetic composite material by adding second particles with a smaller mean particle size to first particles with a high circularity and a large mean particle size to bury gaps between the particles. Thus, the magnetic core formed from the soft magnetic composite material has a high magnetic permeability, and the inductance of the reactor using the magnetic core can be improved, as described, for example, in Japanese Unexamined Patent Application Publication No. 2016-039331.

However, the soft magnetic composite material used for the magnetic core of the reactor described in Japanese Unexamined Patent Application Publication No. 2016-039331 uses a particle size having a high circularity, for example, a particle size of 100 μm to 200 μm, so the magnetic permeability increases, while, on the other hand, there are concerns about an issue that a loss increases in a radio-frequency range.

SUMMARY

Therefore, the present disclosure provides a coil component that provides a high magnetic permeability and that has good radio-frequency characteristics.

A coil component according to the disclosure includes an element assembly including a coil conductor formed by winding a conductor and a magnetic portion containing metal magnetic particles and resin, and an outer electrode electrically connected to an exposed surface of an extended part of the coil conductor, exposed on a surface of the element assembly, and disposed on the surface of the element assembly. The metal magnetic particles include first metal magnetic particles, second metal magnetic particles, and third metal magnetic particles. A particle size distribution of the metal magnetic particles, calculated in accordance with a circle equivalent diameter obtained from a cross-sectional image in a cross section of the magnetic portion, has at least two peaks and at least one bottom. The metal magnetic particles larger than or equal to the bottom having a minimum frequency are defined as large metal magnetic particles. Of the large metal magnetic particles, metal magnetic particles each having a recessed portion that satisfies a predetermined condition in the cross section are defined as the second metal magnetic particles. Of the large metal magnetic particles, metal magnetic particles each not having the recessed portion are defined as the first metal magnetic particles. Metal magnetic particles smaller than the bottom having the minimum frequency are defined as the third metal magnetic particles. The predetermined condition is $L_{02}>L_{01}$ where a minimum distance between distal ends at an opening of the recessed portion is $L_{01}$ and a longest distance of line segments parallel to a line segment that has the minimum distance between the distal ends at the opening in line segments corresponding to chords in the recessed portion, circular in cross section, of each of the second metal magnetic particles is $L_{02}$.

With the coil component according to the disclosure, the metal magnetic particles contained in the magnetic portion are configured as follows. The particle size distribution of the metal magnetic particles, calculated in accordance with the circle equivalent diameter obtained from the cross-sectional image in the cross section of the magnetic portion, has at least two peaks and at least one bottom. The metal magnetic particles larger than or equal to the bottom having the minimum frequency are defined as large metal magnetic particles. The metal magnetic particles include the following metal magnetic particles. Of the large metal magnetic particles, metal magnetic particles each having the recessed portion that satisfies the predetermined condition in the cross section are defined as the second metal magnetic particles. Of the large metal magnetic particles, metal magnetic particles each not having the recessed portion are defined as the first metal magnetic particles. Metal magnetic particles smaller than the bottom having the minimum frequency are defined as the third metal magnetic particles. Therefore, the packing fraction of metal magnetic particles in the magnetic portion increases, so the magnetic permeability of the coil component is increased. The coil component according to the disclosure, in the magnetic portion containing metal magnetic particles and resin, includes, of the large metal magnetic particles, the second metal magnetic particles that are metal magnetic particles each having the recessed portion that satisfies the predetermined condition in the cross section, and the predetermined condition is $L_{02}>L_{01}$ where the minimum distance between the distal ends at the opening of the recessed portion is $L_{01}$ and the longest distance of line segments parallel to the line segment that has the minimum distance between the distal ends at the opening in line segments corresponding to chords in the recessed portion, circular in cross section, of each of the second metal magnetic particles is $L_{02}$. Therefore, the surface area of the second metal magnetic particles with respect to the volume of the magnetic portion is increased, with the result that an eddy current loss in a radio-frequency range reduces, and the coil component is usable even at further higher frequencies.

The above-described object, the other objects, features, and benefits of the disclosure will be further apparent from the following description of modes for carrying out the disclosure with reference to the accompanying drawings.

DETAILED DESCRIPTION

1. Coil Component

Hereinafter, a coil component according to an embodiment of the present disclosure will be described in detail with reference to the accompanying drawings.

Figure 1:
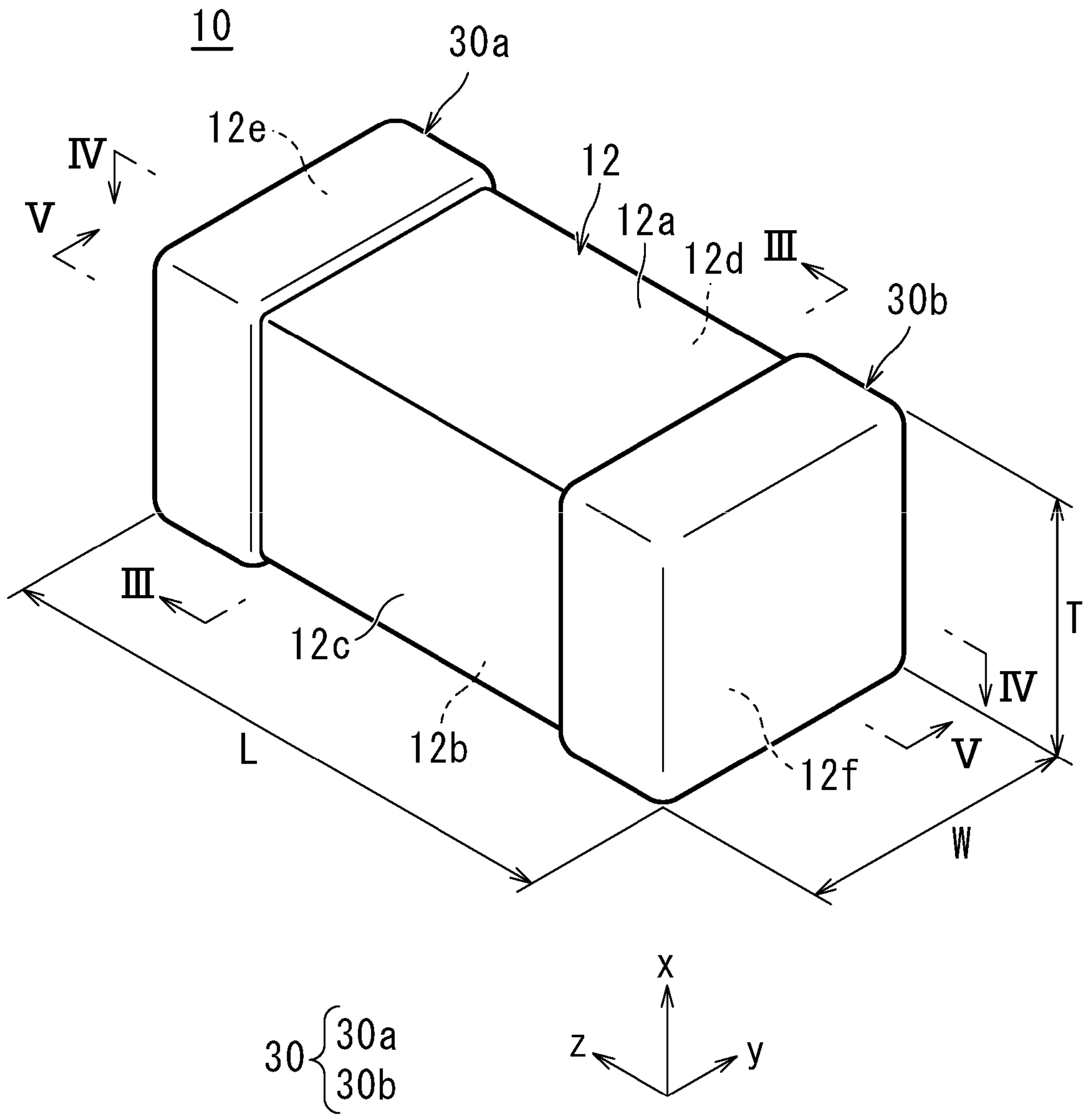
FIG. 1 is an external perspective view that schematically shows an embodiment of a coil component according to the disclosure.
Figure 2:
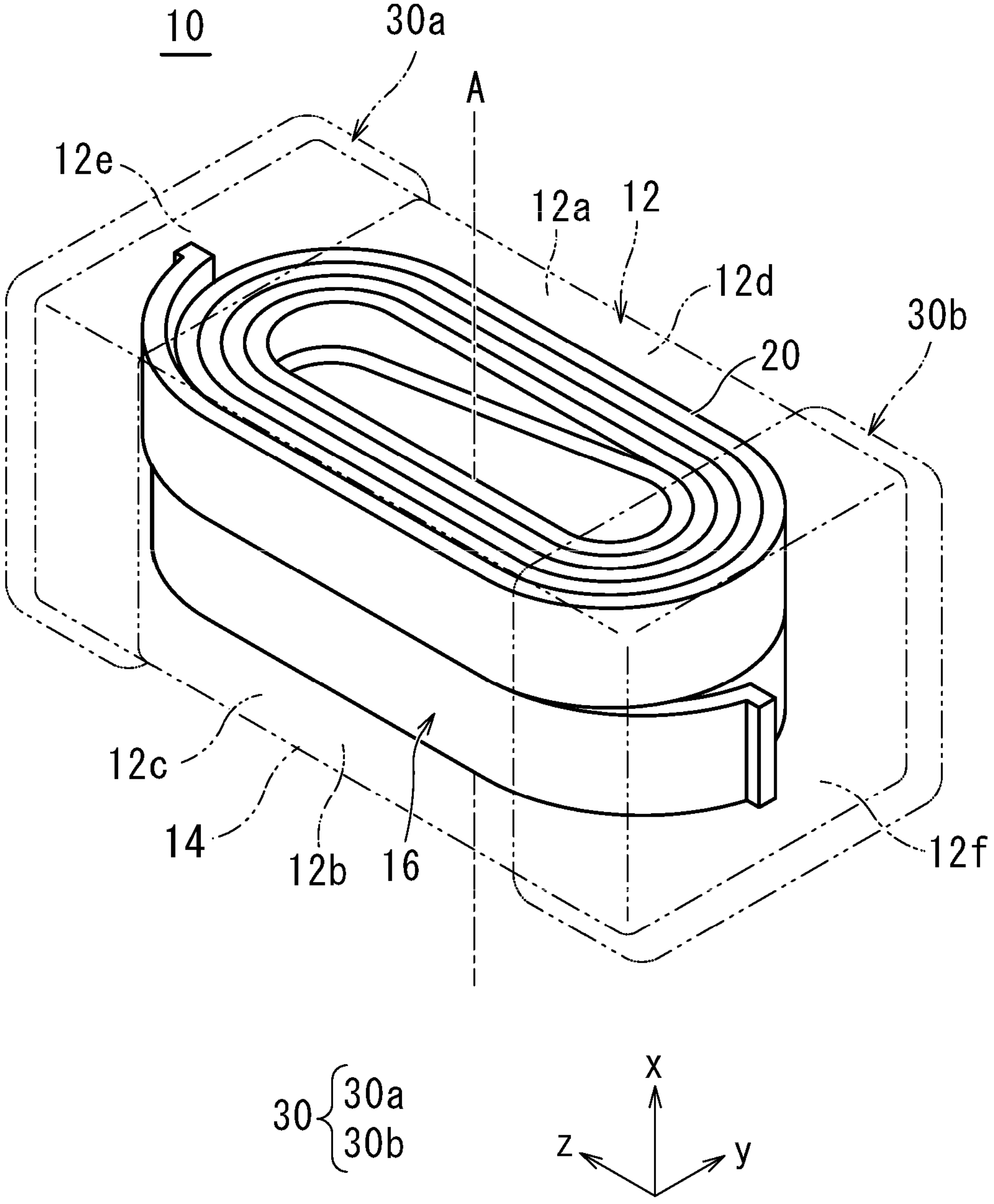
FIG. 2 is a see-through perspective view of a magnetic portion in which a coil conductor is embedded in the coil component shown in FIG. 1.
Figure 3:
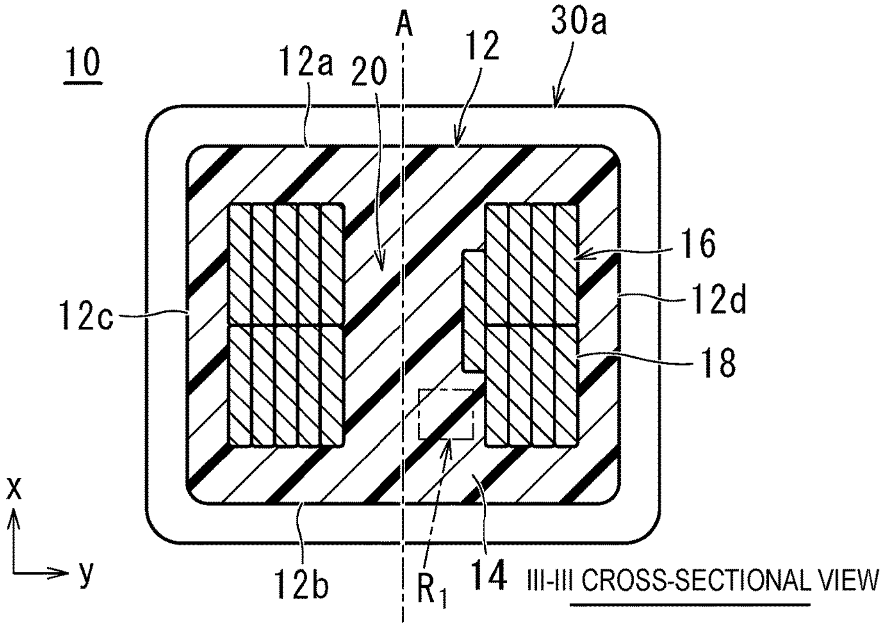
FIG. 3 is a cross-sectional view of the coil component according to the disclosure, taken along the line III-III in FIG. 1.
Figure 4:
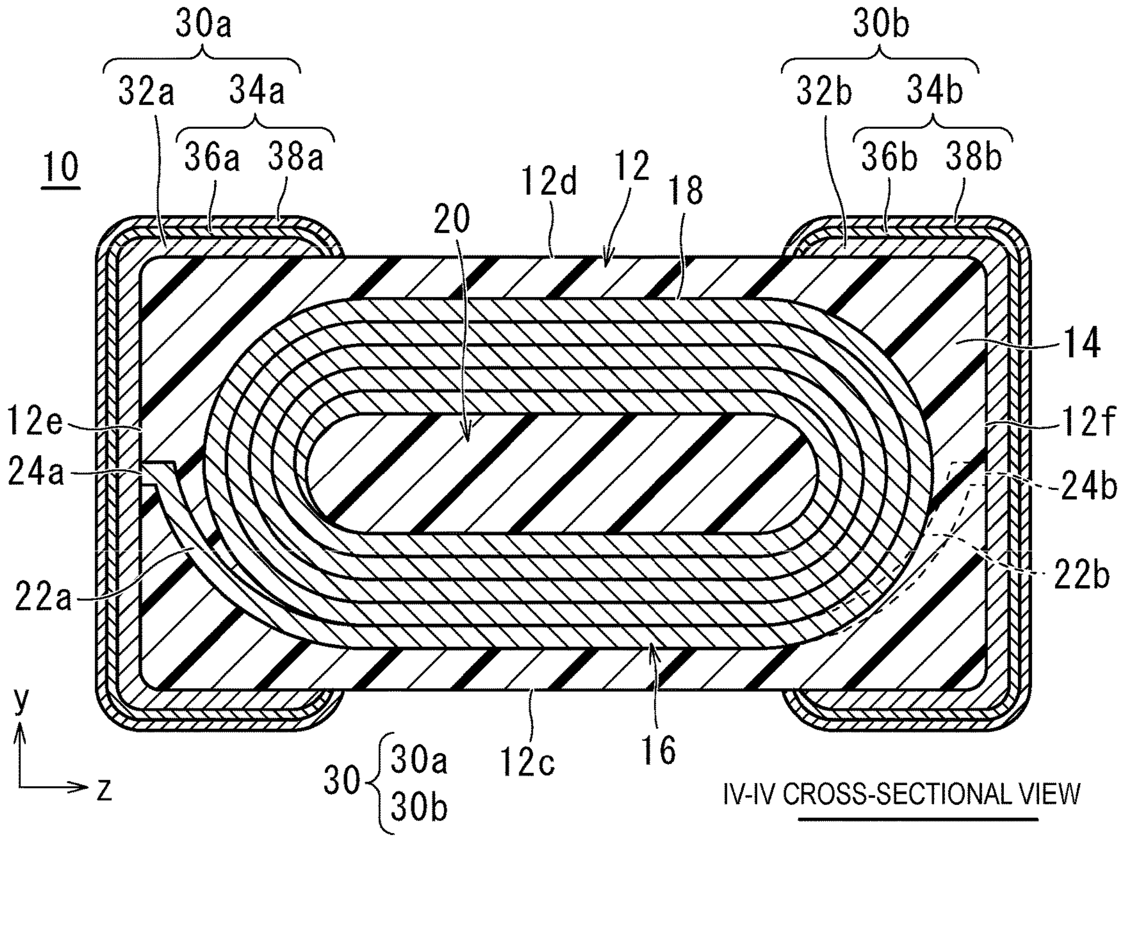
FIG. 4 is a cross-sectional view of the coil component according to the disclosure, taken along the line IV-IV in FIG. 1.

FIG. 1 is an external perspective view that schematically shows the embodiment of the coil component according to the disclosure. FIG. 2 is a see-through perspective view of a magnetic portion in which a coil conductor is embedded in the coil component shown in FIG. 1. FIG. 3 is a cross-sectional view of the coil component according to the disclosure, taken along the line III-III in FIG. 1. FIG. 4 is a cross-sectional view of the coil component according to the disclosure, taken along the line IV-IV in FIG. 1.

The coil component 10 includes a rectangular parallelepiped element assembly 12 and outer electrodes 30.

(a) Element Assembly

The element assembly 12 includes a magnetic portion 14, and a coil conductor 16 embedded in the magnetic portion 14. The external shape of the element assembly 12 is a substantially rectangular parallelepiped shape. The element assembly 12 has a first major surface 12*a* and a second major surface 12*b* opposite to each other in a pressure direction x, a first side surface 12*c* and a second side surface 12*d* opposite to each other in a width direction y orthogonal to the pressure direction x, and a first end surface 12*e* and a second end surface 12*f* opposite to each other in a length direction z orthogonal to the pressure direction x and the width direction y. The dimensions of the element assembly 12 are not limited.

(b) Magnetic Portion

The magnetic portion 14 covers the coil conductor 16. The external shape of the magnetic portion 14 substantially coincides with the external shape of the element assembly 12 and is a substantially rectangular parallelepiped shape. The magnetic portion 14 is formed by heating and pressurizing a first molded body 50 and a second molded body 60 (described later) in a die. The magnetic portion 14 includes a plurality of metal magnetic particles and resin.

The resin is not limited. Examples of the resin include thermosetting resins and include organic materials, such as epoxy resin, phenolic resin, polyester resin, polyimide resin, and polyolefin resin. The resin material may be made up of only one material or may be made up of two or more resin materials.

The metal magnetic particles include first metal magnetic particles 40, second metal magnetic particles 42, and third metal magnetic particles 44.

The first metal magnetic particles 40, the second metal magnetic particles 42, and the third metal magnetic particles 44 are not limited. Examples of the first metal magnetic particles 40, the second metal magnetic particles 42, and the third metal magnetic particles 44 include iron, cobalt, nickel, and alloys containing one or two or more of them. Preferably, the first metal magnetic particles and the second metal magnetic particles are made of iron or iron alloy. The iron alloy is not limited. Examples of the iron alloy include Fe—Si, Fe—Si—Cr, Fe—Ni, and Fe—Si—Al. The first metal magnetic particles and the second metal magnetic particles each may be made of only one material or two or more materials.

The metal magnetic particles of each of the set of first metal magnetic particles 40, the set of second metal magnetic particles 42, and the set of third metal magnetic particles 44 are defined as follows.

Figure 5:
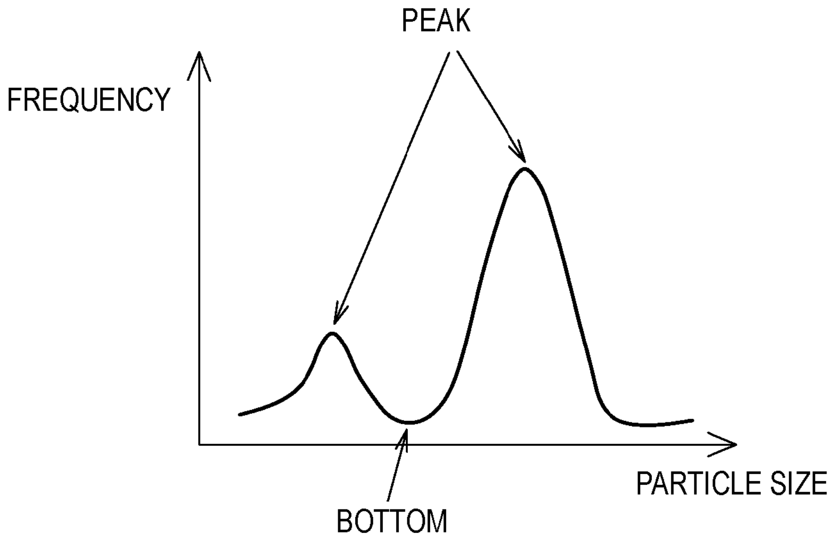
FIG. 5 is a graph that shows a particle size distribution of a circle equivalent diameter in metal magnetic particles in the magnetic portion.

Initially, a median diameter (D50) that is a mean particle size of metal magnetic particles in the magnetic portion 14 is calculated from the cross-sectional images of particles. In other words, initially, the cross section of the coil component 10 is prepared by polishing, FIB, cross section milling, or the like with a method of measuring a circularity (described later) to expose the cross section of metal magnetic particles. Thus, an exposed surface is formed. After the exposed surface is formed by exposing the cross section, the exposed surface is observed with an SEM by a magnification of 500 to 5000. A circle equivalent diameter is calculated for 50 or more particles with an image analysis software Win-ROOF2018. A circle equivalent diameter is the diameter of a circle with the same area as the cross-sectional area of each of the metal magnetic particles. The circle equivalent diameter is calculated as a median diameter (D50) that is a mean particle size of the metal magnetic particles. As shown in FIG. 5, a particle size distribution of the circle equivalent diameters has at least two peaks and one bottom between the peaks, as shown in FIG. 5. The bottom is located between the two peaks and is a point at which the frequency takes a local minimum value.

Then, metal magnetic particles larger than or equal to the bottom having a minimum frequency are defined as large metal magnetic particles. Of the large metal magnetic particles, crescent metal magnetic particles each having a recessed portion that satisfies a predetermined condition (described later) in the cross section are defined as the second metal magnetic particles 42. Of the metal magnetic particles larger than or equal to the bottom having the minimum frequency, spherical metal magnetic particles having no recessed portion are defined as the first metal magnetic particles 40. Metal magnetic particles smaller than the bottom having the minimum frequency are defined as the third metal magnetic particles 44. A median diameter (D50) that is a mean particle size is calculated for each set of the metal magnetic particles, that is, the first metal magnetic particles 40, the second metal magnetic particles 42, and the third metal magnetic particles 44, and is defined as a mean particle size of each set of the metal magnetic particles. When there are only two peaks in the particle size distribution, the bottom between the peaks is a bottom having a minimum frequency.

Figure 6:
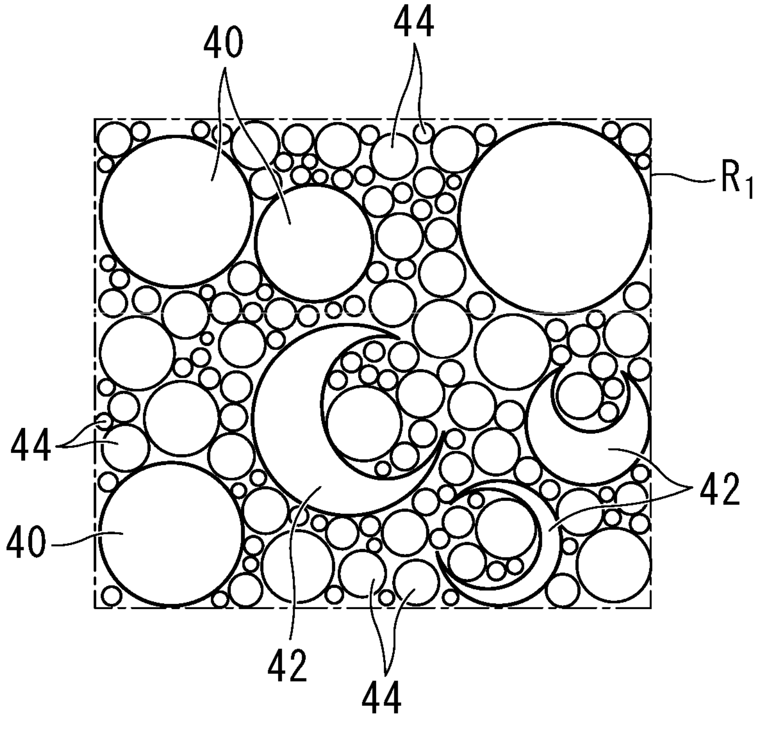
FIG. 6 is a view that shows a state of filling metal magnetic particles in part of a region $R_1$ indicated by the dashed line in FIG. 3.

As shown in FIG. 6, the shape of each of the first metal magnetic particles 40 is spherical, and the cross-sectional shape is circular. A mean particle size in the particle size distribution of the first metal magnetic particles 40 is preferably greater than or equal to 10 μm and less than or equal to 50 μm (i.e., from 10 μm to 50 μm). Since the mean particle size of the first metal magnetic particles 40 is greater than the mean particle size of the other sets of metal magnetic particles, the magnetic permeability of the magnetic portion 14 is increased. When the mean particle size of the first metal magnetic particles 40 is greater than or equal to 10 μm, the magnetic permeability of the coil component 10 is improved. On the other hand, when the mean particle size of the first metal magnetic particles 40 exceeds 50 μm, an eddy current loss in a radio-frequency range increases, so characteristics in the radio-frequency range decrease.

Figure 7:
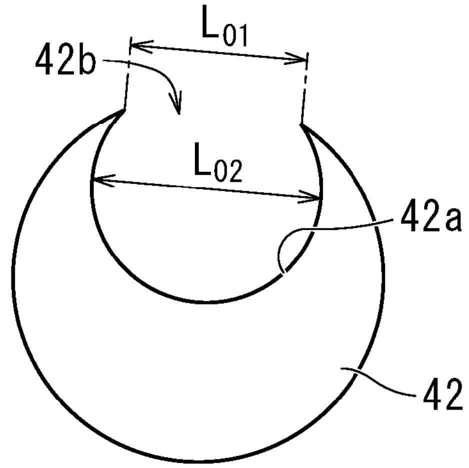
FIG. 7 is a schematic cross-sectional view of a second metal magnetic particle.

The shape of each of the second metal magnetic particles 42 is spherical, and has a spherical recessed portion **42*a* inside. As shown in FIGS. 6 and 7, the cross-sectional shape of each of the second metal magnetic particles 42 is a crescent shape. More specifically, $L_{02}>L_{01}$ is satisfied where a minimum distance between distal ends at an opening 42*b* of the recessed portion 42*a* is $L_{01}$ in the cross section of the second metal magnetic particle 42 and a longest distance of line segments parallel to a line segment that has the minimum distance between the distal ends at the opening 42*b* is Loz in line segments corresponding to chords in the recessed portion 42*a*, circular in cross section, of the second metal magnetic particle 42. When each of the second metal magnetic particles 42 has the above recessed portion 42*a*, the surface area of the second metal magnetic particles 42 with respect to the volume of the magnetic portion 14 is increased in area, so an eddy current loss in a radio-frequency range reduces, and the coil component 10 can be used even at higher frequencies. A mean particle size in the particle size distribution of the second metal magnetic particles 42** is preferably greater than or equal to 10 μm and less than or equal to 50 μm (i.e., from 10 μm to 50 μm).

As shown in FIG. 6, the shape of each of the third metal magnetic particles 44 is spherical, and the cross-sectional shape is circular. A mean particle size in the particle size distribution of the third metal magnetic particles 44 is preferably greater than or equal to 0.2 μm and less than or equal to 10 μm (i.e., from 0.2 μm to 10 μm). The mean particle size is more preferably less than or equal to 8 μm and further preferably less than or equal to 5 μm. When the particle size of each of the third metal magnetic particles 44 is less than the mean particle size of the other sets of metal magnetic particles, the packing fraction of metal magnetic particles in the magnetic portion 14 increases, so the magnetic permeability of the magnetic portion 14 is increased, and direct-current superposition characteristics are improved. When the mean particle size of the third metal magnetic particles 44 are less than or equal to 10 μm, metal magnetic particles can be highly filled in the magnetic portion 14. When the mean particle size of the third metal magnetic particles 44 is less than 0.2 μm, flowability during molding decreases, so high filling is difficult.

The mean particle size of the first metal magnetic particles 40 is preferably greater than the mean particle size of the second metal magnetic particles 42. Since particles with different particle sizes are included, the packing fraction increases, so the magnetic permeability of the magnetic portion 14 is increased. The mean circularity of the first metal magnetic particles 40 is preferably higher than or equal to 0.90. The mean circularity of the second metal magnetic particles 42 is preferably less than or equal to 0.89.

For measurement of the circularity of each metal magnetic particle, calculation is performed as follows. In other words, where, in the cross section of each of the metal magnetic particles, the area of each of the metal magnetic particles is S and the perimeter is L, the circularity is defined as $4\pi S/L^2$. The cross section of metal magnetic particles means the cross section of metal magnetic particles on an exposed surface formed by exposing the cross section of the element assembly 12 of the coil component 10 by polishing, focused ion beam (FIB), cross-section polisher (CP), or the like. After the cross section of the element assembly 12 is exposed to form the exposed surface, the metal magnetic particles are observed with a scanning electron microscope (SEM) by a magnification of 500 to 5000. An area S and a perimeter L are measured for 50 or more particles with an image analysis software WinROOF2018 (Mitani Corporation), and a mean circularity is calculated.

Where a total content of the first metal magnetic particles 40, the second metal magnetic particles 42, and the third metal magnetic particles 44 is 100% in area, the content of the first metal magnetic particles 40 is preferably higher than or equal to 40% and lower than or equal to 80% (i.e., from 40% to 80%). When the content of the first metal magnetic particles 40 is higher than or equal to 40% and lower than or equal to 80% (i.e., from 40% to 80%), the effective magnetic permeability of the coil component 10 is increased.

Where a total content of the first metal magnetic particles 40, the second metal magnetic particles 42, and the third metal magnetic particles 44 is 100% in area, the content of the second metal magnetic particles 42 is preferably higher than or equal to 2% and lower than or equal to 40% (i.e., from 2% to 40%). When the content of the second metal magnetic particles 42 is higher than or equal to 2% and lower than or equal to 40% (i.e., from 2% to 40%), the effective magnetic permeability of the coil component 10 is increased.

Where a total content of the first metal magnetic particles 40, the second metal magnetic particles 42, and the third metal magnetic particles 44 is 100% in area, the content of the third metal magnetic particles 44 is preferably higher than or equal to 10% and lower than or equal to 30% (i.e., from 10% to 30%). When the content of the third metal magnetic particles 44 is higher than or equal to 10% and lower than or equal to 30% (i.e., from 10% to 30%), the effective magnetic permeability of the coil component 10 is increased. When the content of the third metal magnetic particles 44 is higher than or equal to 15% and lower than or equal to 25% (i.e., from 15% to 25%), the effective magnetic permeability of the coil component 10 is further increased, so it is preferable.

Here, the content of each of the set of first metal magnetic particles 40, the set of second metal magnetic particles 42, and the set of third metal magnetic particles 44 is calculated as will be described below. In other words, the cross section of the magnetic portion 14 is exposed, and, for example, in a selected area of 500 μm×500 μm in the cross section, the content of each set of metal magnetic particles ((Content of first metal magnetic particles)=Sa/(Sa+Sb+Sc), (Content of second metal magnetic particles)=Sb/(Sa+Sb+Sc), and (Content of third metal magnetic particles)=Sc/(Sa+Sb+Sc)) is calculated from the total sum of the cross-sectional areas of each set of metal magnetic particles (the total sum of cross-sectional areas $S_1$ of the first metal magnetic particles 40 is Sa, the total sum of cross-sectional areas $S_2$ of the second metal magnetic particles 42 is Sb, and the total sum of cross-sectional areas $S_3$ of the third metal magnetic particles 44 is Sc).

Each of the first metal magnetic particles 40 and each of the second metal magnetic particles 42 preferably have the same composition. Because of the same composition, the flow of magnetic flux inside the magnetic portion 14 is uniform, so the superposition characteristics are raised.

The composition of a metal magnetic particle can be analyzed as follows. In other words, the composition of a metal magnetic particle can be analyzed with a chemical composition analyzer, such as energy dispersive X-ray spectroscopy (EDX), (X-ray photoelectron spectroscopy (XPS), and time of flight secondary ion mass spectroscopy (TOF-SIMS).

In the magnetic portion 14, the content of resin (in area) is preferably higher than or equal to 5% and lower than or equal to 25% (i.e., from 5% to 25%). Thus, the area ratio of the metal magnetic particles contained in the magnetic portion 14 increases, so the magnetic permeability of the magnetic portion 14 is increased. When the content of resin is lower than or equal to 5%, flowability is not ensured during molding, so high filling is difficult to be obtained.

Here, in the magnetic portion 14, the content of resin is calculated as will be described below. In other words, the cross section of the magnetic portion 14 is exposed, and, for example, in a selected region of 500 μm×500 μm in the cross section, the content of resin is calculated as the area of resin to the area St of the selected region of 500 μm×500 μm.

Figure 8A:
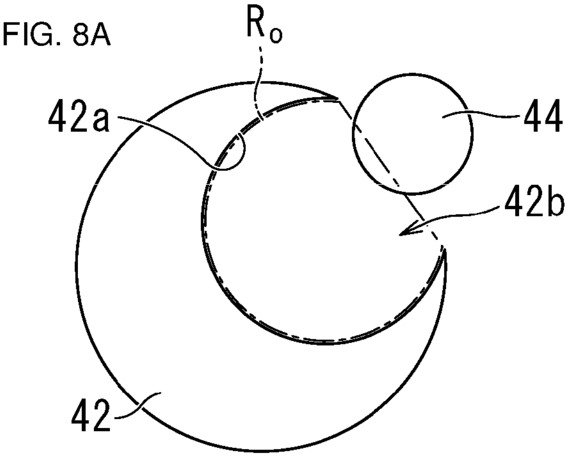
FIGS. 8A to 8D are diagrams that show a state where part or whole of at least one of third metal magnetic particles is disposed inside a recessed portion of the second metal magnetic particle in a cross section of the magnetic portion.
Figure 8B:
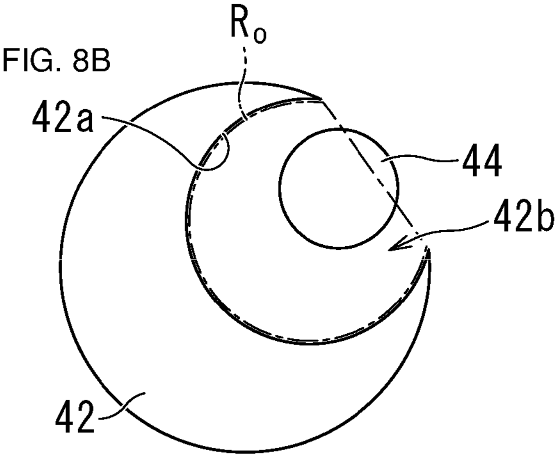

In the cross section of the magnetic portion 14, as shown in FIGS. 8A and 8B, at least part of at least one of the third metal magnetic particles 44 is preferably disposed inside the recessed portion 42*a* of each of the second metal magnetic particles 42. Since the third metal magnetic particle 44 is placed inside the recessed portion 42*a* of each of the second metal magnetic particles 42, a decrease in the magnetic permeability of the magnetic portion 14 due to the recessed portion 42*a* is suppressed.

Figure 8C:
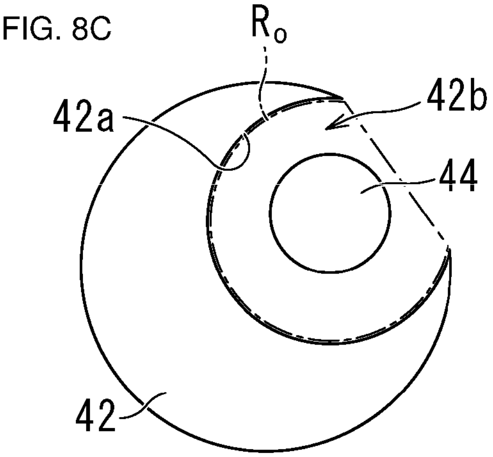
Figure 8D:
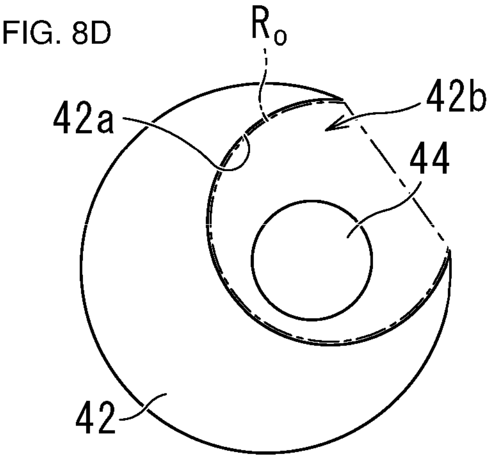

In the cross section of the magnetic portion 14, as shown in FIGS. 8C and 8D, the whole of at least one of the third metal magnetic particles 44 is preferably disposed inside the recessed portion 42*a* of each of the second metal magnetic particles 42. Since the third metal magnetic particle 44 is placed inside the recessed portion 42*a* of each of the second metal magnetic particles 42, the magnetic permeability of the magnetic portion 14 is increased.

Figure 9:
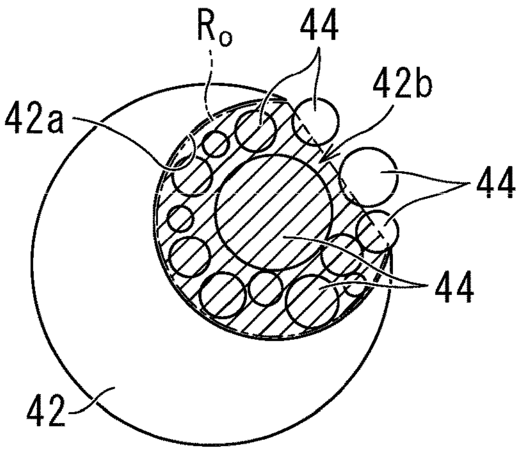
FIG. 9 is a diagram that shows a state where part or whole of each of the plurality of third metal magnetic particles is disposed inside the recessed portion of the second metal magnetic particle in the cross section of the magnetic portion.

In the cross section of the magnetic portion 14, when the whole of at least one of the third metal magnetic particles 44 is placed inside the recessed portion 42*a* of each of the second metal magnetic particles 42 as shown in FIG. 9, the content of the third metal magnetic particles 44 inside the recessed portion 42*a* is preferably higher than or equal to 40% on average. Since the third metal magnetic particles 44 are placed inside the recessed portion 42*a* of each of the second metal magnetic particles 42, the magnetic permeability of the magnetic portion 14 is increased. The content of the third metal magnetic particles 44 inside the recessed portion 42*a* of each of the second metal magnetic particles 42 is calculated as the percentage of the total sum of the areas of the third metal magnetic particles 44 located in a region $R_0$ inside the line segment that has the minimum distance between the distal ends at the opening 42*b* of each of the second metal magnetic particles 42 to the area of the region $R_0$ at the opening 42*b*, as shown in FIG. 9.

Figure 10:
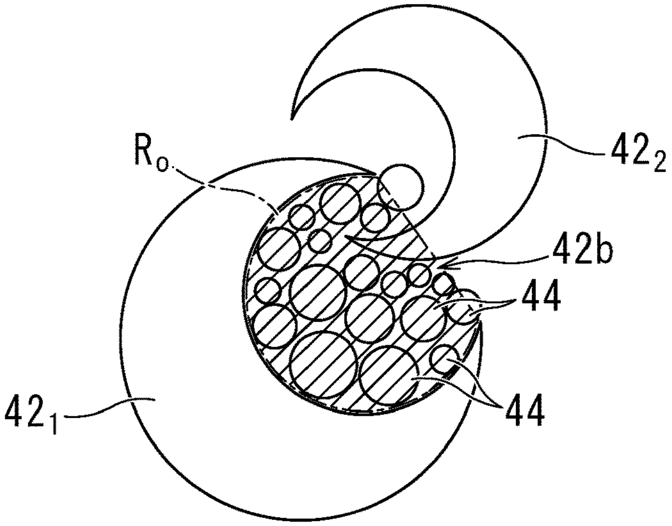
FIG. 10 is a diagram that shows a state where, in the cross section of the magnetic portion, at least part of at least another one of the second metal magnetic particles and at least part or whole of the third metal magnetic particles are disposed inside the recessed portion of the second metal magnetic particle.

In the cross section of the magnetic portion 14, as shown in FIG. 10, at least part of at least another one second metal magnetic particle 422 and at least part of the third metal magnetic particles 44 are placed inside the recessed portion 42*a* of the second metal magnetic particle 421, and the content of the another second metal magnetic particle 422 and the third metal magnetic particles 44 in the recessed portion 42*a* of the second metal magnetic particle 421 is preferably higher than or equal to 50% on average. Since the another second metal magnetic particle 42 and the third metal magnetic particles 44 are placed inside the recessed portion 42*a* of each of the second metal magnetic particles 42, the magnetic permeability of the magnetic portion 14 is increased. The content of the another second metal magnetic particle 422 and the third metal magnetic particles 44 inside the recessed portion 42*a* of the second metal magnetic particle 421 is calculated as the percentage of the total sum of the areas of the another second metal magnetic particle 422 and the third metal magnetic particles 44 located in the region $R_0$ inside the line segment that has the minimum distance between the distal ends at the opening 42*b* of the second metal magnetic particle 421 to the area of the region $R_0$ at the opening 42*b*, as shown in FIG. 10.

Figure 11:
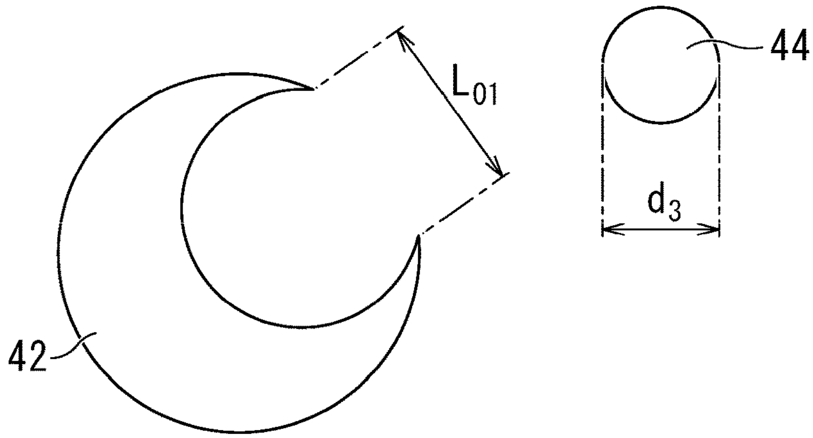
FIG. 11 is a diagram that shows a comparison in the cross section of the magnetic portion between a minimum distance $L_{01}$ between distal ends at an opening of the recessed portion of the second metal magnetic particle and the third metal magnetic particle having a particle size $d_3$ where a peak having a maximum frequency is located in the particle size distribution of third metal magnetic particles.

In the cross section of the magnetic portion 14, as shown in FIG. 11, the average value of the minimum distance $L_{01}$ between the distal ends at the opening 42*b* of the recessed portion 42*a* of each of the second metal magnetic particles 42 preferably satisfies $L_{01}>d_3$ where a particle size at which a peak having the maximum frequency is located in the particle size distribution of the third metal magnetic particles 44 is $d_3$. Since the opening 42*b* of each of the second metal magnetic particles 42 is greater than the diameter at which a peak having the maximum frequency is located in the particle size distribution of the third metal magnetic particles 44, the third metal magnetic particles 44 easily enter the recessed portion 42*a*, so the magnetic permeability of the magnetic portion 14 is increased.

Figure 12:
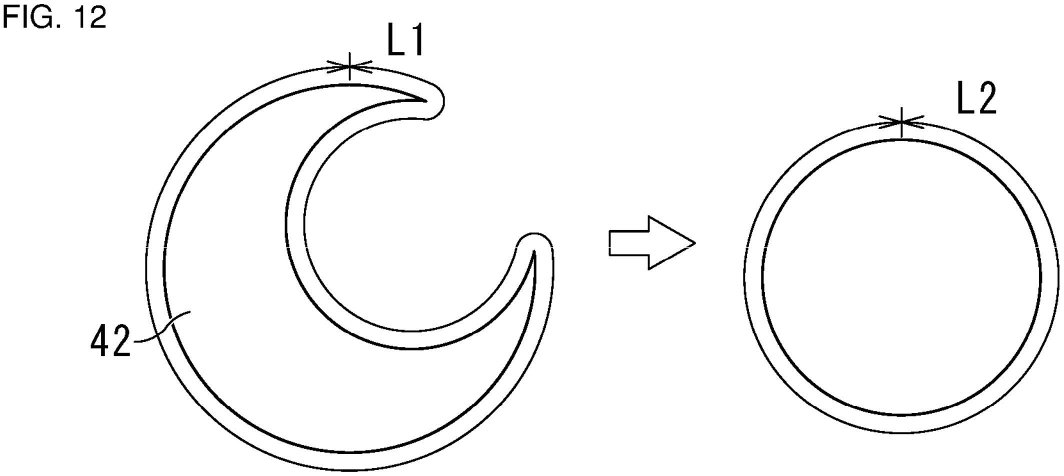
FIG. 12 is a diagram that shows, in the cross section of the magnetic portion, an outer perimeter L1 of a crescent second metal magnetic particle and a perimeter L2 of a circle having an area equivalent to an area of the second metal magnetic particle.

As for the second metal magnetic particles 42, where, as shown in FIG. 12, in the cross section of the magnetic portion 14, the outer perimeter of the second metal magnetic particle 42 having the crescent recessed portion 42*a* is L1 and the perimeter of a circle having an area equivalent to the area of the second metal magnetic particle 42 is L2, the average value of L1/L2 is preferably less than or equal to 5.0. When the average value of L1/L2 is less than or equal to 5.0, an eddy current loss in a radio-frequency range reduces, so the coil component 10 can be used even at higher frequencies. When the average value of L1/L2 exceeds 5.0, the recessed portion 42*a* of each of the second metal magnetic particles 42 is large, so it is difficult for the second metal magnetic particles 42 to flow during thermoforming of the first molded body 50 and the second molded body 60 (described later) that make up the magnetic portion 14. Therefore, the packing fraction of metal magnetic particles in the magnetic portion 14 decreases, with the result that the magnetic permeability and direct-current superposition characteristics of the coil component 10 decrease. The average value of L1/L2 is more preferably greater than or equal to 1.2.

Here, the perimeter of the second metal magnetic particle 42 is measured from the cross section of the magnetic portion 14. In other words, the cross section of a metal magnetic particle is the cross section of a metal magnetic particle in an exposed surface formed by exposing a molded body cross section including the center of the element assembly 12 of the coil component 10 and orthogonal to the length direction z of the element assembly 12, by cross-section polisher (or polishing, FIB processing, or the like). After the exposed surface is formed by exposing the cross section of the element assembly 12, particles are observed with an SEM by a magnification of 500 to 5000. L1 and L2 are calculated with an image analysis software Win-ROOF2018. L1/L2 is calculated for 50 or more particles, and the average value is calculated by obtaining the average value of them.

Figure 13:
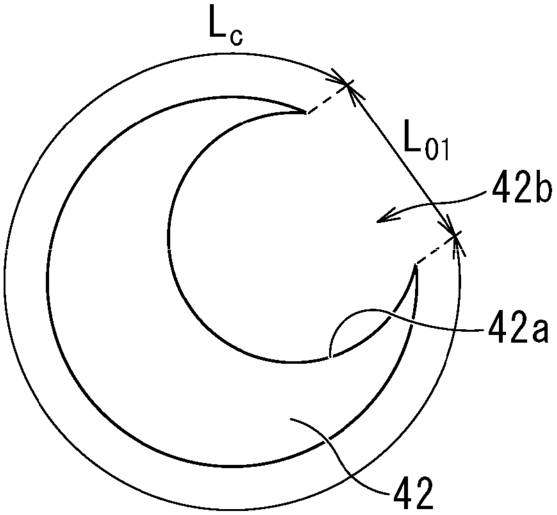
FIG. 13 is a diagram that shows, in the cross section of the magnetic portion, the minimum distance $L_{01}$ between the distal ends at the opening of the recessed portion of the second metal magnetic particle and a perimeter Lc other than an inside of the opening of the recessed portion of the second metal magnetic particle.

As for the second metal magnetic particles 42, where, as shown in FIG. 13, in the cross section of the magnetic portion 14, the minimum distance between the distal ends at the opening 42*b* of the recessed portion 42*a* of each of the second metal magnetic particles 42 is $L_{01}$ and a perimeter other than the inside of the opening 42*b* of the recessed portion 42*a* of each of the second metal magnetic particles 42 is Lc, the average value of $L_{01}/(Lc+L_{01})$ is preferably greater than or equal to 0.03 and less than or equal to 0.4 (i.e., from 0.03 to 0.4). When the average value of $L_{01}/(Lc+L_{01})$ is greater than or equal to 0.03, the third metal magnetic particles 44 easily enter the inside of the recessed portion 42*a*. For this reason, due to high filling of metal magnetic particles in the magnetic portion 14, the magnetic permeability of the coil component 10 is increased, and direct-current superposition characteristics are improved. On the other hand, when the average value of $L_{01}/(Lc+L_{01})$ exceeds 0.4, the second metal magnetic particles 42 are hard to flow, with the result that the packing fraction of metal magnetic particles in the magnetic portion 14 decreases.

$L_{01}$ and Lc are measured from the cross-sectional image of the element assembly 12 of the coil component 10. Here, $L_{01}$ and Lc of each of the second metal magnetic particles 42 are calculated by the following procedure. The cross section of a metal magnetic particle is the cross section of a metal magnetic particle in an exposed surface formed by exposing the cross section of the element assembly 12, including the center of the element assembly 12 of the coil component 10 and orthogonal to the length direction z of the element assembly 12, by cross-section polisher (or polishing, FIB processing, or the like). After the exposed surface is formed by exposing the cross section of the element assembly 12, particles are observed with an SEM by a magnification of 500 to 5000. $L_{01}$ and Lc are calculated with an image analysis software WinROOF2018. $L_{01}$ is a shortest distance between the distal ends at the opening 42*b* of each of the second metal magnetic particles 42. Lc is a perimeter other than the inside of the opening 42*b* of each of the second metal magnetic particles 42. $L_{01}/(Lc+L_{01})$ is calculated for 10 or more particles, and the average value is calculated by obtaining the average value of them.

Figure 14:
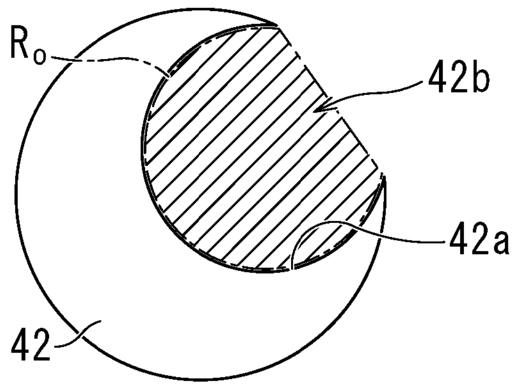
FIG. 14 is a diagram that shows, in the cross section of the magnetic portion, an area $S_0$ of a region $R_0$ inside a line segment that has the minimum distance at the opening of the second metal magnetic particle and a cross-sectional area Sc of the second metal magnetic particle.

As for the second metal magnetic particles 42, where, as shown in FIG. 14, in the cross section of the magnetic portion 14, the area of the region $R_0$ inside the line segment that has the minimum distance between the distal ends at the opening 42*b* of each of the second metal magnetic particles 42 is $S_0$ and the cross-sectional area of each of the second metal magnetic particles 42 having the recessed portion 42*a* is Sc, the average value of $S_0/(Sc+S_0)$ is preferably greater than or equal to 0.05 and less than or equal to 0.8 (i.e., from 0.05 to 0.8). When $S_0/(Sc+S_0)$ is greater than or equal to 0.05, the third metal magnetic particles 44 easily enter the recessed portion 42*a* of each of the second metal magnetic particles 42, so the magnetic permeability of the coil component 10 is increased. When $S_0/(Sc+S_0)$ exceeds 0.8, the second metal magnetic particles 42 easily deform during molding of the first molded body 50 and the second molded body 60 (described later) that make up the magnetic portion 14, so high filling of metal magnetic particles in the magnetic portion 14 is difficult.

$S_0$ and Sc are measured from the cross-sectional image of the magnetic portion 14. Here, $S_0$ and Sc of each of the second metal magnetic particles 42 can be calculated by the following procedure. The cross section of a metal magnetic particle is the cross section of a metal magnetic particle in an exposed surface formed by exposing the cross section of the element assembly 12, including the center of the element assembly 12 of the coil component 10 and orthogonal to the length direction z of the element assembly 12, by cross-section polisher (or polishing, FIB processing, or the like). After the exposed surface is formed by exposing the cross section of the element assembly 12, particles are observed with an SEM by a magnification of 500 to 5000. $S_0$ and Sc are calculated with an image analysis software Win-ROOF2018. $S_0$ is the area of the region $R_0$ of the recessed portion 42*a* inside the line segment connecting the distal ends at the opening 42*b* of each of the second metal magnetic particles 42 by a shortest distance. Sc is the cross-sectional area of each of the second metal magnetic particles 42. $S_0/(Sc+S_0)$ is calculated for 50 or more particles, and the average value is calculated by obtaining the average value of them.

The magnetic portion 14 preferably further contains inorganic oxide particles 46. The inorganic oxide particles 46 are, for example, a silica filler, ferrite, or glass. Since the inorganic oxide particles 46 have higher electric resistivity than the metal magnetic particles, the withstand voltage of the coil component 10 is improved when the magnetic portion 14 contains the inorganic oxide particles 46. The inorganic oxide particles 46 are preferably glass or non-magnetic ferrite. Since glass or non-magnetic ferrite has a high magnetic reluctance, the superposition characteristics of the coil component 10 are raised. The inorganic oxide particles 46 are preferably magnetic ferrite. Since magnetic ferrite has a high magnetic permeability, the magnetic permeability of the coil component 10 is further increased.

Figure 15A:
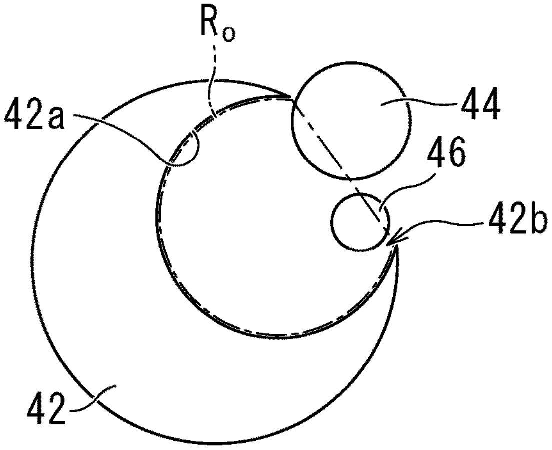
FIGS. 15A to 15D are diagrams that show a state where, in the cross section of the magnetic portion, at least part of at least one of the third metal magnetic particles and at least part or whole of at least one of inorganic oxide particles are disposed at the same time inside the recessed portion of the second metal magnetic particle.
Figure 15C:
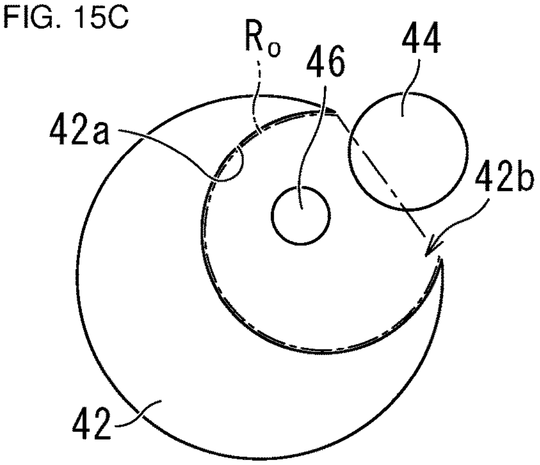
Figure 15B:
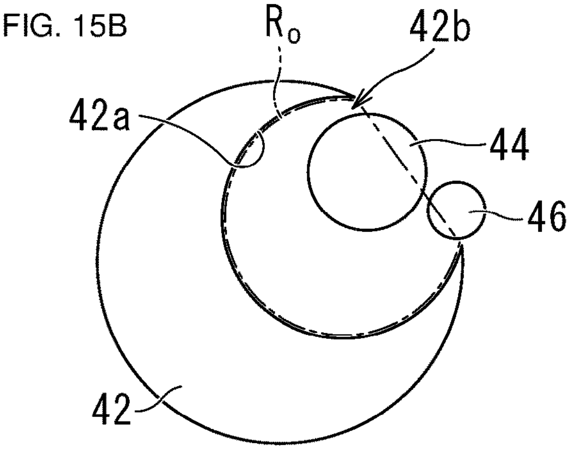

As for the second metal magnetic particles 42, as shown in FIGS. 15A and 15B, in the cross section of the magnetic portion 14, at least part of at least one of the third metal magnetic particles 44 and at least part of at least one of the inorganic oxide particles 46 are preferably disposed at the same time inside the recessed portion 42*a* of each of the second metal magnetic particles 42.

Figure 15D:
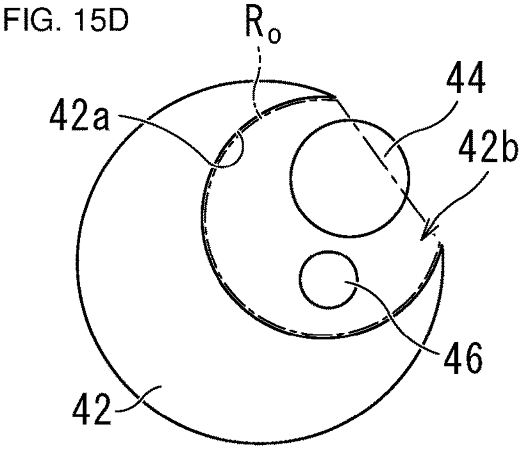

As for the second metal magnetic particles 42, as shown in FIGS. 15C and 15D, in the cross section of the magnetic portion 14, at least part of at least one of the third metal magnetic particles 44 and the whole of at least one of the inorganic oxide particles 46 are more preferably placed at the same time in the recessed portion 42*a* of each of the second metal magnetic particles 42.

The surface of each of the first metal magnetic particles 40, the second metal magnetic particles 42, and the third metal magnetic particles 44 may be covered with an electrically insulating coating. By covering the surface of each of the metal magnetic particles with the electrically insulating coating, the internal resistance of the magnetic portion 14 is increased. Since electrical insulating properties of the surface of each of the metal magnetic particles are ensured by the electrically insulating coating, a short-circuit failure between the coil conductor 16 and each of the outer electrodes 30 is suppressed.

Figure 16:
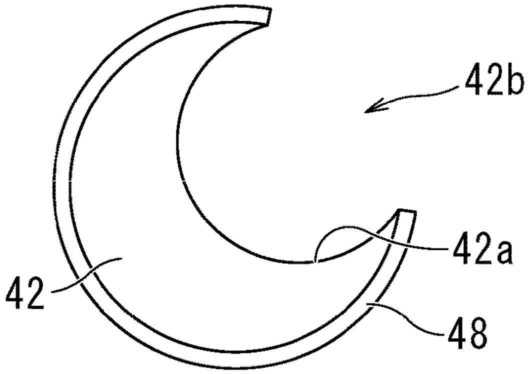
FIG. 16 is a diagram that shows a state where an electrically insulating coating is formed on the second metal magnetic particle.

As shown in FIG. 16, it is preferable that an electrically insulating coating 48 be formed on the outer surface of each of the second metal magnetic particles 42 and the electrically insulating coating 48 be not formed on at least part of a surface inside the recessed portion 42*a* of each of the second metal magnetic particles 42. It is more preferable that the electrically insulating coating 48 be not formed on the whole inside the recessed portion 42*a*. Since there is no electrically insulating coating 48 inside the recessed portion 42*a* of each of the second metal magnetic particles 42, the percentage of magnetic body area increases, with the result that the effective magnetic permeability of the magnetic portion 14 is increased.

Examples of the material of the electrically insulating coating include silicon oxide, phosphoric acid glass, and bismuth glass.

The thickness of the electrically insulating coating is not limited and can be preferably greater than or equal to 5 nm and less than or equal to 500 nm (i.e., from 5 nm to 500 nm), more preferably greater than or equal to 5 nm and less than or equal to 100 nm (i.e., from 5 nm to 100 nm), and further preferably greater than or equal to 10 nm and less than or equal to 100 nm (i.e., from 10 nm to 100 nm). By further increasing the thickness of the electrically insulating coating, improvement in the withstand voltage characteristics of the magnetic portion 14 and improvement in direct-current superposition characteristics are expected. By further reducing the thickness of the electrically insulating coating, the amount of metal magnetic particles in the magnetic portion 14 is further increased, so the magnetic permeability of the magnetic portion 14 improves.

(c) Coil Conductor

The coil conductor 16 has a winding part 18, a first extended part 22*a*, and a second extended part 22*b*. The winding part 18 is formed by winding a conductor containing an electrically conductive material in a coil shape. The first extended part 22*a* is extended to one side of the winding part 18. The second extended part 22*b* is extended to the other side of the winding part 18. A hollow region 20 is formed at the center of the winding part 18. The winding part 18 is formed by winding in two stages. The coil conductor 16 is formed by winding a rectangular conductor in an a-winding shape. The first extended part 22*a* is exposed from the first end surface 12*e* of the element assembly 12 to form a first exposed portion 24*a*. The second extended part 22*b* is exposed from the second end surface 12*f* of the element assembly 12 to form a second exposed portion 24*b*. In the first exposed portion 24*a*, an exposed surface of the first extended part 22*a* is formed so as to intersect with an extension direction of the first extended part 22*a*. In the second exposed portion 24*b*, an exposed surface of the second extended part 22*b* is formed so as to intersect with an extension direction of the second extended part 22*b*.

The coil conductor 16 is made up of a conductor, such as a metal wire and a wire. The electrically conductive material of the coil conductor 16 is not limited and is, for example, a metal component made of Ag, Au, Cu, Ni, Sn, or an alloy of at least one of them. Preferably, the electrically conductive material is copper. The electrically conductive material may be made up of only one material or may be made up of two or more materials.

The surface of the conductor that makes up the coil conductor 16 is coated with an electrically insulating substance to form an electrically insulating film. By coating the conductor that makes up the coil conductor 16 with an electrically insulating substance, electrical insulation between portions of the wound coil conductor 16 and between the coil conductor 16 and the magnetic portion 14 is further ensured. No electrically insulating film is formed on each of portions respectively corresponding to the first exposed portion 24*a* and the second exposed portion 24*b* of the conductor that makes up the coil conductor 16.

The electrically insulating substance of the electrically insulating film is not limited. Examples of the electrically insulating substance include polyurethane, polyester resin, epoxy resin, polyamide-imide resin, and polyimide resin. Preferably, the electrically insulating film is polyamide-imide resin. The thickness of the electrically insulating film is preferably greater than or equal to 2 μm and less than or equal to 10 μm (i.e., from 2 μm to 10 μm).

No electrically insulating film is disposed on an exposed part (exposed surface) of each of the first exposed portion 24*a* and second exposed portion 24*b* of the coil conductor 16 on a corresponding one of both end surfaces 12*e*, 12*f* of the element assembly 12. Thus, the coil conductor 16 can be directly electrically connected to a first base electrode layer 32*a* and a second base electrode layer 32*b*, so it is possible to reduce electrical resistance between the coil conductor 16 and each of the first base electrode layer 32*a* and the second base electrode layer 32*b*.

(d) Outer Electrode

The outer electrodes 30 are respectively disposed on the first end surface 12*e* side of the element assembly 12 and the second end surface 12*f* side of the element assembly 12. The outer electrodes 30 include a first outer electrode 30*a* and a second outer electrode 30*b*.

The first outer electrode 30*a* is disposed on the surface of the first end surface 12*e* of the element assembly 12. The first outer electrode 30*a* may be formed so as to extend from the first end surface 12*e* and cover part of each of the first major surface 12*a*, the second major surface 12*b*, the first side surface 12*c*, and the second side surface 12*d* or may be formed so as to extend from the first end surface 12*e* to the second major surface 12*b* and cover part of each of the first end surface 12*e* and the second major surface 12*b*. In this case, the first outer electrode 30*a* is directly electrically connected to the first exposed portion 24*a* of the coil conductor 16 and is electrically connected to the first extended part 22*a*.

The second outer electrode 30*b* is disposed on the surface of the second end surface 12*f* of the element assembly 12. The second outer electrode 30*b* may be formed so as to extend from the second end surface 12*f* and cover part of each of the first major surface 12*a*, the second major surface 12*b*, the first side surface 12*c*, and the second side surface 12*d* or may be formed so as to extend from the second end surface 12*f* to the second major surface 12*b* and cover part of each of the second end surface 12*f* and the second major surface 12*b*. In this case, the second outer electrode 30*b* is directly electrically connected to the second exposed portion 24*b* of the coil conductor 16 and is electrically connected to the second extended part 22*b*.

The thickness of each of the first outer electrode 30*a* and the second outer electrode 30*b* is not limited and can be, for example, greater than or equal to 1 μm and less than or equal to 50 μm (i.e., from 1 μm to 50 μm) and preferably greater than or equal to 5 μm and less than or equal to 20 μm (i.e., from 5 μm to 20 μm).

The first outer electrode 30*a* includes the first base electrode layer 32*a* and a first plating layer 34*a* disposed on the surface of the first base electrode layer 32*a*. Similarly, the second outer electrode 30*b* includes the second base electrode layer 32*b* and a second plating layer 34*b* disposed on the surface of the second base electrode layer 32*b*.

The first base electrode layer 32*a* is disposed on the surface of the first end surface 12*e* of the element assembly 12. Therefore, the first base electrode layer 32*a* is directly in contact with the first exposed portion 24*a* of the coil conductor 16. The first base electrode layer 32*a* may be formed so as to extend from the first end surface 12*e* and cover part of each of the first major surface 12*a*, the second major surface 12*b*, the first side surface 12*c*, and the second side surface 12*d* or may be formed so as to extend from the first end surface 12*e* and cover part of each of the first end surface 12*e* and the second major surface 12*b*.

The second base electrode layer 32*b* is disposed on the surface of the second end surface 12*f* of the element assembly 12. Therefore, the second base electrode layer 32*b* is directly in contact with the second exposed portion 24*b* of the coil conductor 16. The second base electrode layer 32*b* may be formed so as to extend from the second end surface 12*f* and cover part of each of the first major surface 12*a*, the second major surface 12*b*, the first side surface 12*c*, and the second side surface 12*d* or may be formed so as to extend from the second end surface 12*f* and cover part of each of the second end surface 12*f* and the second major surface 12*b*.

The first base electrode layer 32*a* and the second base electrode layer 32*b* may be made up of a resin electrode layer. The resin electrode layer includes a resin component and a metal component. The resin component of the resin electrode layer includes at least one selected from among urethane resin, epoxy resin, phenolic resin, acrylic resin, silicon resin, polyimide resin, polyamide-imide resin, polyamide resin, and the like. The metal component of the resin electrode layer includes, for example, at least one selected from among Cu, Ni, Ag, Pd, Ag—Pd alloy, Au, and the like. The resin electrode layer may be made up of multiple layers. The resin electrode layer may be formed by applying electrically conductive paste containing a resin component and a metal component on the element assembly 12 by dipping and then thermally curing the electrically conductive paste.

The first base electrode layer 32*a* and the second base electrode layer 32*b* may be respectively formed as plated electrodes. The first base electrode layer 32*a* and the second base electrode layer 32*b* may be formed by electrolytic plating or may be formed by electroless plating.

A main component of a metal material that is a component of the first base electrode layer 32*a* and a component of the second base electrode layer 32*b* and a main component of a metal material that is a component of the coil conductor 16 preferably have the same composition. Thus, a metallic bond between the coil conductor 16 and each of the first base electrode layer 32*a* and the second base electrode layer 32*b* gets stronger, so the bonding strength increases, and a direct current resistance is reduced.

The average thickness of the first base electrode layer 32*a* and the second base electrode layer 32*b* is, for example, 10 μm.

The first plating layer 34*a* is disposed so as to cover the first base electrode layer 32*a*. Specifically, the first plating layer 34*a* may be disposed so as to cover the first base electrode layer 32*a* disposed on the first end surface 12*e*, and may be disposed so as to extend from the first end surface 12*e* and cover the surface of the first base electrode layer 32*a* disposed on the first major surface 12*a*, the second major surface 12*b*, the first side surface 12*c*, and the second side surface 12*d*, or may be disposed so as to extend from the first end surface 12*e* and cover the first base electrode layer 32*a* disposed so as to cover part of the second major surface 12*b*.

The second plating layer 34*b* is disposed so as to cover the second base electrode layer 32*b*. Specifically, the second plating layer 34*b* may be disposed so as to cover the second base electrode layer 32*b* disposed on the second end surface 12*f*, and may be disposed so as to extend from the second end surface 12*f* and cover the surface of the second base electrode layer 32*b* disposed on the first major surface 12*a*, the second major surface 12*b*, the first side surface 12*c*, and the second side surface 12*d*, or may be disposed so as to cover the second base electrode layer 32*b* disposed so as to extend from the second end surface 12*f* and cover part of the second major surface 12*b*.

The metal material of the first plating layer 34*a* and the second plating layer 34*b* includes, for example, at least one selected from among Cu, Ni, Ag, Sn, Pd, Ag—Pd alloy, Au, and the like.

The first plating layer 34*a* and the second plating layer 34*b* each may be formed in multiple layers. The first plating layer 34*a* has a two-layer structure of a first Ni plating layer 36*a* and a first Sn plating layer 38*a* formed on the surface of the first Ni plating layer 36*a*. The second plating layer 34*b* has a two-layer structure of a second Ni plating layer 36*b* and a second Sn plating layer 38*b* formed on the surface of the second Ni plating layer 36*b*.

The average thickness of each of the first Ni plating layer 36*a* and the second Ni plating layer 36*b* is, for example, 5 μm. The average thickness of each of the first Sn plating layer 38*a* and the second Sn plating layer 38*b* is, for example, 10 μm.

The first outer electrode 30*a* and the second outer electrode 30*b* may be provided with the following configuration. For example, the first base electrode layer 32*a* and the second base electrode layer 32*b* each may be an Ag-containing resin electrode or may be made up of an Ag sputter layer, Cu sputter layer, or Ti sputter layer through sputtering. When the first base electrode layer 32*a* and the second base electrode layer 32*b* each are made up of an Ag-containing resin electrode, a glass frit may be contained. When the first base electrode layer 32*a* and the second base electrode layer 32*b* each are made up of a sputter layer, a Cu sputter layer may be formed on a Ti sputter layer. The first plating layer 34*a* may have an outermost layer made up of the Sn plating layer 38*a* only. The second plating layer 34*b* may have an outermost layer made up of the Sn plating layer 38*b* only. In addition, an Ag plating layer or an Ni plating layer may be formed on the element assembly 12 without forming the first base electrode layer 32*a* or the second base electrode layer 32*b*.

Where the dimension of the coil component 10 in the length direction z is defined as L dimension, the L dimension is preferably greater than or equal to 1.0 mm and less than or equal to 12.0 mm (i.e., from 1.0 mm to 12.0 mm). Where the dimension of the coil component 10 in the width direction y is defined as W dimension, the W dimension is preferably greater than or equal to 0.5 mm and less than or equal to 12.0 mm (i.e., from 0.5 mm to 12.0 mm). Where the dimension of the coil component 10 in the pressure direction x is defined as T dimension, the T dimension is preferably greater than or equal to 0.5 mm and less than or equal to 6.0 mm (i.e., from 0.5 mm to 6.0 mm).

With the coil component 10 shown in FIG. 1, the metal magnetic particles contained in the magnetic portion 14 are configured as follows. The particle size distribution of the mean particle size of the metal magnetic particles, calculated in accordance with a circle equivalent diameter obtained from the cross-sectional image in the cross section of the magnetic portion 14, has at least two peaks and at least one bottom. The metal magnetic particles larger than or equal to the bottom having the minimum frequency are defined as large metal magnetic particles. The metal magnetic particles include the following metal magnetic particles. Of the large metal magnetic particles, metal magnetic particles each having the recessed portion 42*a* that satisfies the predetermined condition in the cross section are defined as the second metal magnetic particles 42. Of the large metal magnetic particles, metal magnetic particles each not having the recessed portion 42*a* are defined as the first metal magnetic particles 40. Metal magnetic particles smaller than the bottom having the minimum frequency are defined as the third metal magnetic particles 44. Therefore, the packing fraction of metal magnetic particles in the magnetic portion 14 increases, so the magnetic permeability of the coil component 10 is increased.

With the coil component 10 shown in FIG. 1, the magnetic portion 14 containing metal magnetic particles and resin includes, of the large metal magnetic particles, the second metal magnetic particles 42 that are metal magnetic particles each having the recessed portion 42*a* that satisfies the predetermined condition in the cross section, and the predetermined condition is $L_{02}>L_{01}$ where the minimum distance between the distal ends at the opening 42*b* of the recessed portion 42*a* is $L_{01}$ and the longest distance of line segments parallel to the line segment that has the minimum distance between the distal ends at the opening 42*b* in line segments corresponding to chords in the recessed portion 42*a*, circular in cross section, of each of the second metal magnetic particles 42 is $L_{02}$. Therefore, the surface area of the second metal magnetic particles 42 with respect to the volume of the magnetic portion 14 is increased, with the result that an eddy current loss in a radio-frequency range reduces, and the coil component 10 is usable even at further higher frequencies.

2. Manufacturing Method for Coil Component

Next, a manufacturing method for the coil component will be described.

The manufacturing method for the coil component includes (a) a process of manufacturing granulated powder, (b) a process of manufacturing a first molded body and a second molded body, (c) a process of manufacturing an element assembly, and (d) a process of forming outer electrodes.

(a) Process of Manufacturing Granulated Powder

Granulated powder to be manufactured is a composite material containing metal magnetic particles A, metal magnetic particles B, metal magnetic particles C, resin, and solvent.

Preparation of Metal Magnetic Particles

Initially, the metal magnetic particles A, the metal magnetic particles B, and the metal magnetic particles C are prepared.

Metal Magnetic Particles A

For example, Fe-based soft magnetic material powder made of a-Fe, Fe—Si, Fe—Si—Cr, Fe—Si—Al, Fe—Ni, Fe—Co, or the like can be used as the metal magnetic particles A. The material form of metal magnetic particles is preferably amorphous with good soft magnetic characteristics; however, the configuration is not limited thereto. The material form may be crystalline.

The metal magnetic particles A are prepared by gas atomization or water atomization.

The mean particle size of the metal magnetic particles A is preferably greater than or equal to 10 μm and less than or equal to 50 μm (i.e., from 10 μm to 50 μm). A mean particle size is, for example, a median diameter (D50). When the mean particle size of the metal magnetic particles A exceeds 50 μm, an eddy current loss in a radio-frequency range increases, with the result that characteristics in the radio-frequency range decrease.

The surface of each of the metal magnetic particles A is coated with an electrically insulating coating. Here, when the electrically insulating coating is formed by a mechanical method, metal magnetic particles and electrically insulating material powder are charged in a rotating container, and particulate composite is formed by mechanochemical process. Thus, an electrically insulating coating is formed to coat the surface of magnetic powder.

As for the material of the above-described metal magnetic particles A, for example, Fe—Si—Cr alloy particles having a mean particle size of 28 μm and coated with an electrically insulating coating made of zinc phosphate glass with a thickness of 10 nm is prepared. The Fe—Si—Cr alloy particles contain 90.8 wt % of Fe, 6.7 wt % of $S_1$, and 2.5 wt % of Cr.

Metal Magnetic Particles B

For example, Fe-based soft magnetic material powder made of a-Fe, Fe—Si, Fe—Si—Cr, Fe—Si—Al, Fe—Ni, Fe—Co, or the like can be used as the metal magnetic particles B. The material form of metal magnetic particles is preferably amorphous with good soft magnetic characteristics; however, the configuration is not limited thereto. The material form may be crystalline.

The mean particle size of the metal magnetic particles B is preferably greater than or equal to 10 μm and less than or equal to 50 μm (i.e., from 10 μm to 50 μm). A mean particle size is, for example, a median diameter (D50). When the mean particle size of the metal magnetic particles B exceeds 50 μm, an eddy current loss in a radio-frequency range increases, with the result that characteristics in the radio-frequency range decrease.

The metal magnetic particles B include particles with a recessed portion. To form a recessed portion in each of the metal magnetic particles B, a process that will be described below is performed. In other words, the metal magnetic particles B are prepared by gas atomization or water atomization on magnetic material powder prepared. Here, by increasing the amount of spray of gas or water or increasing a spray pressure, it is possible to facilitate formation of cavities, increase the size of cavities, or control the sphericity. Ordinarily, when a recessed portion is intended to be formed in each metal magnetic particle by atomization, the shape of each particle deviates from spherical form, and the mean sphericity of all the particles prepared increases. In the present embodiment, the metal magnetic particles B are prepared by water atomization. The content ratio between metal magnetic particles with a cavity and metal magnetic particles without a cavity can be adjusted by sorting the appearances of the metal magnetic particles prepared. A method of preparing metal magnetic particles with a recessed portion is not limited to atomization, and another method may be used.

The outer surface of each of the metal magnetic particles B is coated with an electrically insulating coating. Here, when the electrically insulating coating is formed by a mechanical method, metal magnetic particles and electrically insulating material powder are charged in a rotating container, and particulate composite is formed by mechanochemical process. Thus, an electrically insulating coating is formed to coat the surface of magnetic powder. It is preferable that no electrically insulating coating be formed inside the recessed portion of each of the metal magnetic particles B. When no electrically insulating coating is formed inside the recessed portion of each of the metal magnetic particles B, the effective magnetic permeability of the coil component is increased.

As for the material of the above-described metal magnetic particles B with a recessed portion, for example, Fe—Si—Cr alloy particles having a mean particle size of 20 μm and coated with an electrically insulating coating made of zinc phosphate glass with a thickness of 10 nm is prepared. The Fe—Si—Cr alloy particles contain 90.8 wt % of Fe, 6.7 wt % of $S_1$, and 2.5 wt % of Cr.

Metal Magnetic Particles C

For example, Fe-based soft magnetic material powder made of a-Fe, Fe—Si, Fe—Si—Cr, Fe—Si—Al, Fe—Ni, Fe—Co, or the like can be used as the metal magnetic particles C. The material form of metal magnetic particles is preferably amorphous with good soft magnetic characteristics; however, the configuration is not limited thereto. The material form may be crystalline.

The metal magnetic particles C are prepared by gas atomization or water atomization.

The mean particle size of the metal magnetic particles C is preferably greater than or equal to 0.2 μm and less than or equal to 5 μm (i.e., from 0.2 μm to 5 μm). A mean particle size is, for example, a median diameter (D50). When the mean particle size of the metal magnetic particles C are less than 0.2 μm, flowability during molding decreases, so high filling is difficult.

The surface of each of the metal magnetic particles C is coated with an electrically insulating coating. Here, when the electrically insulating coating is formed by a mechanical method, metal magnetic particles and electrically insulating material powder are charged in a rotating container, and particulate composite is formed by mechanochemical process. Thus, an electrically insulating coating is formed to coat the surface of magnetic powder.

As for the material of the above-described metal magnetic particles C, for example, Fe—Si—Cr alloy particles having a mean particle size of 4 μm and coated with an electrically insulating coating made of zinc phosphate glass with a thickness of 10 nm is prepared. The Fe—Si—Cr alloy particles contain 90.8 wt % of Fe, 6.7 wt % of $S_1$, and 2.5 wt % of Cr.

The mean particle size of each set of metal magnetic particles is measured by the following method. Initially, a median diameter (D50) that is the mean particle size of each set of metal magnetic particles before granulation can be measured with a laser diffraction particle size distribution measuring device or the like. Here, a median diameter (D50) means an average particle size D50 (a particle size equivalent to 50% in accumulated percentage on a volume basis).

Resin

Examples of the resin material contained in a composite material include thermosetting resins and include organic materials, such as epoxy resin, phenolic resin, polyester resin, polyimide resin, and polyolefin resin. The resin material may be made up of only one material or may be made up of two or more resin materials. In the present embodiment, epoxy resin is used as the thermosetting resin. The content of resin is preferably relatively low because the effective magnetic permeability of the coil component 10 is increased. Specifically, the content of resin is particularly preferably lower than or equal to 25% (in area). On the other hand, when the content of resin is lower than 5%, flowability is not ensured during molding, and high filling is difficult, so the content of resin is preferably higher than or equal to 5%.

In the present embodiment, granulated powder molding is mixed at the following volume ratio. In other words, (Metal magnetic particles A):(Metal magnetic particles B):(Metal magnetic particles C):(Resin)=49:7:19:25.

Solvent

Acetone is prepared as a solvent.

Manufacture of Granulated Powder

Subsequently, granulated powder is manufactured by using the prepared metal magnetic particles A, metal magnetic particles B, metal magnetic particles C, resin material, and solvent.

Initially, the metal magnetic particles A, the metal magnetic particles B, and the metal magnetic particles C are mixed in a stirring container and stirred. A mixture ratio of the sets of metal magnetic particles to be mixed is, in weight ratio, (Metal magnetic particles A):(Metal magnetic particles B):(Metal magnetic particles C)=70:5:25. As the ratio between the particle size of the metal magnetic particles A and the particle size of the metal magnetic particles C ((Mean particle size of the metal magnetic particles A)/(Mean particle size of the metal magnetic particles C)) and the ratio between the particle size of the metal magnetic particles B and the particle size of the metal magnetic particles C ((Mean particle size of the metal magnetic particles B)/(Mean particle size of the metal magnetic particles C)) increases, the packing fraction of metal magnetic particles of a coil component increases, with the result that the magnetic permeability is increased, and the direct-current superposition characteristics are raised.

After that, the prepared resin and solvent are charged into the metal magnetic particles A, metal magnetic particles B, and metal magnetic particles C mixed and stirred in the stirring container. The amount of resin charged is 3.0 wt % of the total weight of the metal magnetic particles A, the metal magnetic particles B, and the metal magnetic particles C, and the amount of solvent charged is 1.0 wt % of the total weight of the metal magnetic particles A, the metal magnetic particles B, and the metal magnetic particles C.

Subsequently, the metal magnetic particles A, the metal magnetic particles B, the metal magnetic particles C, the resin, and the solvent, charged in the stirring container, are stirred and dried.

Granulated powder is obtained by removing coarse particles from the composite material made up of the stirred metal magnetic particles A, metal magnetic particles B, metal magnetic particles C, resin, and solvent with a sieve shaker.

By changing the mixture ratio of the sets of metal magnetic particles, mixing and stirring time, the value of $L_{01}/d_3$, and the like, a percentage by which another one of the second metal magnetic particles or a third metal magnetic particle is disposed inside the recessed portion of each of the second metal magnetic particles is adjusted.

(b) Process of Manufacturing First Molded Body and Second Molded Body

Next, the first molded body 50 and the second molded body 60 are manufactured by using the obtained granulated powder.

Figure 17:
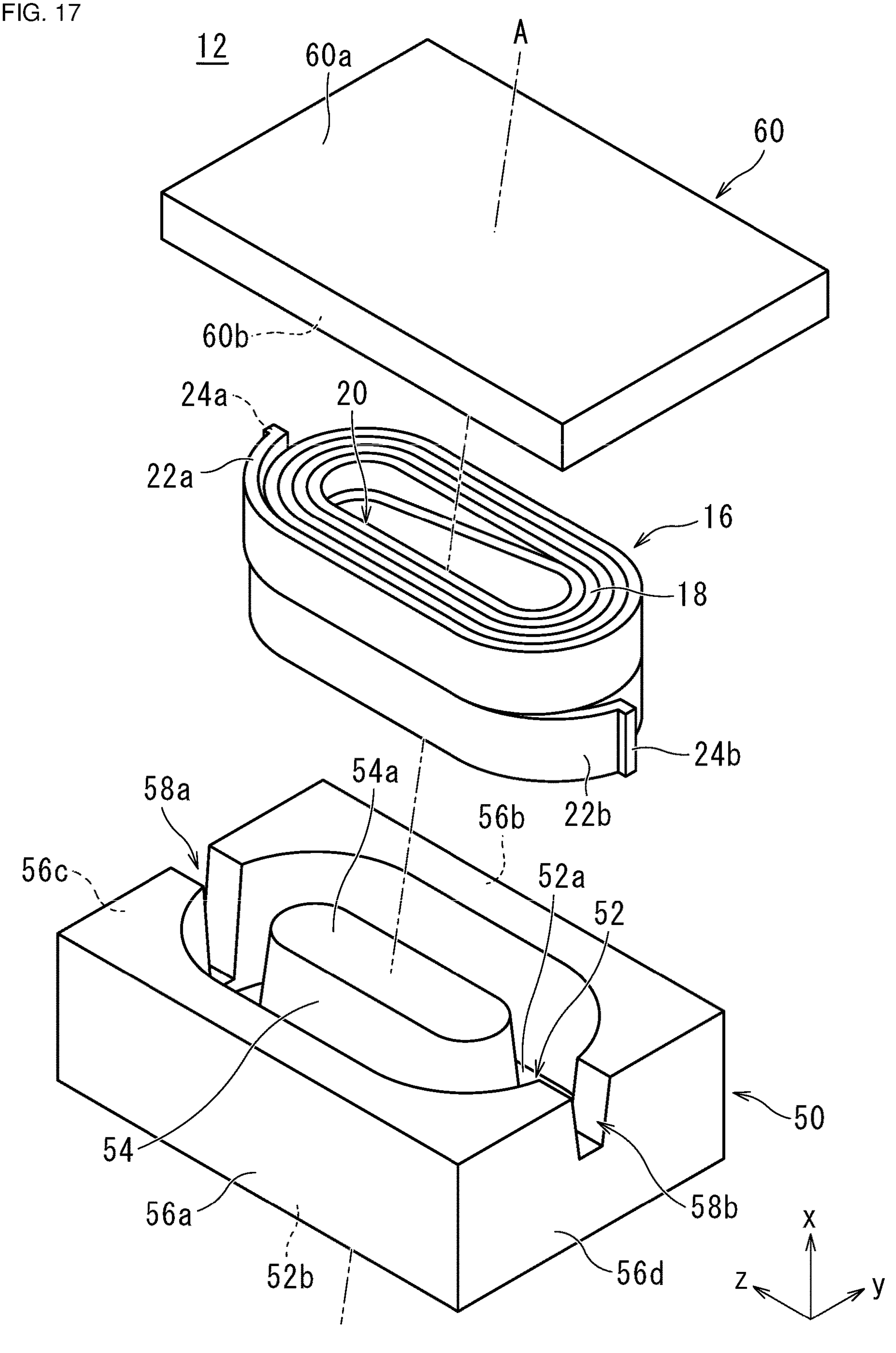
FIG. 17 is an exploded perspective view that shows a state where a coil conductor is assembled to a first molded body and a second molded body in manufacturing an element assembly.

Here, initially, the structure of the first molded body 50 will be described. As shown in FIG. 17, the first molded body 50 has a plate-shaped bottom portion 52, a columnar winding axis portion 54, a first side surface wall portion 56*a*, a second side surface wall portion 56*b*, a first end surface wall portion 56*c*, and a second end surface wall portion 56*d*. The winding axis portion 54 is provided on a top surface 52*a* of the bottom portion 52. The first side surface wall portion 56*a*, the second side surface wall portion 56*b*, the first end surface wall portion 56*c*, and the second end surface wall portion 56*d* surround the winding axis portion 54 and are provided on the top surface 52*a* of the bottom portion 52. The first side surface wall portion 56*a* and the second side surface wall portion 56*b* are disposed on the top surface 52*a* of the bottom portion 52 so as to be opposite to each other in the width direction y. The first end surface wall portion 56*c* and the second end surface wall portion 56*d* are disposed on the top surface 52*a* of the bottom portion 52 so as to be opposite to each other in the length direction z. The first end surface wall portion 56*c* has a first notch 58*a*. The second end surface wall portion 56*d* has a second notch 58*b*. The cross section of the winding axis portion 54, taken in a substantially perpendicular direction to a central axis A, has an oval shape or a substantially elliptical shape. As shown in FIG. 17, the winding axis portion 54 may be tapered with distance from the bottom portion 52. In other words, the winding axis portion 54 may be formed such that a distal end portion 54*a* is narrower than a base connected to the bottom portion 52.

Next, the structure of the second molded body 60 will be described. As shown in FIG. 17, the second molded body 60 has a first major surface 60*a* and a second major surface 60*b* that are substantially rectangular plate-shaped members.

The above-described first molded body 50 and second molded body 60 are manufactured as follows. Initially, granulated powder manufactured in the process of manufacturing granulated powder is molded with a die into a first molded body. At this time, the temperature is set to a room temperature, and a pressure of 50 MPa is applied. After that, the manufactured granulated powder is molded with a die into a second molded body. At this time, the temperature is set to a room temperature, and a pressure of 50 MPa is applied.

The first molded body and the second molded body manufactured as described above are further subjected to a temperature of 100° C. for 10 seconds to be temporarily cured. Thus, the first molded body 50 and the second molded body 60 are manufactured.

(c) Process of Manufacturing Element Assembly

Subsequently, the element assembly 12 in which the coil conductor 16 is embedded is manufactured by using the manufactured first molded body 50 and second molded body 60.

As shown in FIG. 17, the top surface 52*a* of the bottom portion 52 of the first molded body 50 and one major surface 60*a* (or 60*b*) of the second molded body 60 are placed opposite to each other, and the coil conductor 16 is assembled between the first molded body 50 and the second molded body 60. Then, the first molded body 50 and the second molded body 60 are bonded in a state where the coil conductor 16 is sandwiched.

More specifically, initially, the first molded body 50 is accommodated in the cavity of a die for molding an element assembly. Subsequently, the coil conductor 16 is disposed between the first molded body 50 and the second molded body 60 such that the winding axis portion 54 of the first molded body 50 is disposed in the hollow region 20 of the winding part 18. At this time, the coil conductor 16 is disposed such that the first extended part 22*a* of the coil conductor 16 is extended through the first notch 58*a* of the first molded body 50 and the second extended part 22*b* is extended through the second notch 58*b* of the first molded body 50. An electrically insulating coating is formed on the surface of the coil conductor 16. The second molded body 60 is placed so as to cover the first molded body 50 in which the coil conductor 16 is disposed. Subsequently, the temperature is increased to 200° C. in a state where the second molded body 60 is placed on the first molded body 50. Then, in a heated state, a pressure of 10 MPa is applied for 120 seconds for thermoforming.

The element assembly 12 is manufactured in this way.

(d) Process of Forming Outer Electrodes

Next, the first outer electrode 30*a* is formed on the first end surface 12*e* of the element assembly 12, and the second outer electrode 30*b* is formed on the second end surface 12*f*.

Subsequently, Ag-containing electrically conductive paste that will be a base electrode layer is applied to the first end surface 12*e* and second end surface 12*f* of the element assembly 12 to form base electrode layers. When a resin electrode layer is formed as the base electrode layer, electrically conductive paste containing a resin component and metal is applied by a method of, for example, dipping or the like, and then a thermosetting process is performed. Thus, the base electrode layer is formed. The temperature of the thermosetting process at this time is preferably higher than or equal to 120° C. and lower than or equal to 200° C. (i.e., from 120° C. to 200° C.).

Next, a plating layer is formed on the surface of the base electrode layer. More specifically, an Ni plating layer is formed on the base electrode layer, an Sn plating layer is formed on the Ni plating layer. Thus, the outer electrode 30 is formed. In this way, the first exposed portion 24*a* of the coil conductor 16 is electrically connected to the first outer electrode 30*a*, and the second exposed portion 24*b* of the coil conductor 16 is electrically connected to the second outer electrode 30*b*. In performing a plating process, plating is formed by electroless plating.

The coil component 10 is manufactured in this way.

As described above, the embodiment of the present disclosure is described in the specification; however, the present disclosure is not limited thereto. Various modifications may be added to the embodiment described above in terms of mechanism, shape, material, number, location, arrangement, or the like without departing from the scope of the technical idea and object of the present disclosure, and the present disclosure encompasses those modifications.

What is claimed is:

1. A coil component comprising:

an element assembly including a coil conductor including a wound conductor, and a magnetic portion containing metal magnetic particles and resin; and an outer electrode electrically connected to an exposed surface of an extended part of the coil conductor, exposed on a surface of the element assembly, and on the surface of the element assembly, wherein the metal magnetic particles include first metal magnetic particles, second metal magnetic particles, and third metal magnetic particles, a particle size distribution of the metal magnetic particles, calculated in accordance with a circle equivalent diameter obtained from a cross-sectional image in a cross section of the magnetic portion, has at least two peaks and at least one bottom, and metal magnetic particles larger than or equal to the bottom having a minimum frequency are defined as large metal magnetic particles, those of the large metal magnetic particles having a recessed portion that satisfies a predetermined condition in the cross section are defined as the second metal magnetic particles, those of the large metal magnetic particles not having the recessed portion are defined as the first metal magnetic particles, those of the metal magnetic particles smaller than the bottom having the minimum frequency are defined as the third metal magnetic particles, and the predetermined condition is $L_{02}>L_{01}$, where a minimum distance between distal ends at an opening of the recessed portion is $L_{01}$, and a longest distance of line segments parallel to a line segment that has the minimum distance between the distal ends of the opening in line segments corresponding to chords in the recessed portion of a cross section of each of the second metal magnetic particles is $L_{02}$.

2. The coil component according to claim 1, wherein a mean particle size of the first metal magnetic particles is greater than a mean particle size of the second metal magnetic particles.

3. The coil component according to claim 1, wherein a mean particle size of the first metal magnetic particles is from 10 μm to 50 μm.

4. The coil component according to claim 1, wherein a mean particle size of the third metal magnetic particles is from 0.2 μm to 10 μm.

5. The coil component according to claim 1, wherein each of the first metal magnetic particles and each of the second metal magnetic particles have the same composition.

6. The coil component according to claim 1, wherein an electrically insulating coating is on an outer surface of each of the second metal magnetic particles, and an electrically insulating coating is absent from at least part of a surface inside the recessed portion of each of the second metal magnetic particles.

7. The coil component according to claim 1, wherein in the cross section of the magnetic portion, a content of the resin is from 5% to 25% in area.

8. The coil component according to claim 1, wherein where a total content of the first metal magnetic particles, the second metal magnetic particles, and the third metal magnetic particles is 100% in area, a content of the first metal magnetic particles is from 40% to 80%, a content of the second metal magnetic particles is from 2% to 40%, and a content of the third metal magnetic particles is from 10% to 30%.

9. The coil component according to claim 1, wherein at least part of at least one of the third metal magnetic particles is inside the recessed portion of at least one of the second metal magnetic particles.

10. The coil component according to claim 1, wherein a whole of at least one of the third metal magnetic particles is inside the recessed portion of at least one of the second metal magnetic particles.

11. The coil component according to claim 1, wherein when a whole of at least one of the third metal magnetic particles is inside the recessed portion of at least one of the second metal magnetic particles in the cross section of the magnetic portion, a content of the third metal magnetic particles inside the recessed portion is higher than or equal to 40% on average.

12. The coil component according to claim 1, wherein in the cross section of the magnetic portion, at least part of at least one of other second metal magnetic particles and at least part of the third metal magnetic particles are inside the recessed portion of at least one of the second metal magnetic particles, and a content of the other second metal magnetic particles and the third metal magnetic particles in the recessed portion of the second metal magnetic particles is higher than or equal to 50% on average.

13. The coil component according to claim 1, wherein where a particle size at which a peak having a maximum frequency is located in a particle size distribution of the third metal magnetic particles is $d_3$, an average value of the minimum distance $L_{01}$ between the distal ends at the opening of the recessed portion of each of the second metal magnetic particles in the cross section of the magnetic portion satisfies $L_{01}>d_3$.

14. The coil component according to claim 1, wherein where an outer perimeter of the second metal magnetic particle having the recessed portion is L1 and a perimeter of a circle having an equivalent circle area is L2 in the cross section of the magnetic portion, an average value of L1/L2 is less than or equal to 5.0.

15. The coil component according to claim 1, wherein where the minimum distance between the distal ends at the opening of the recessed portion of each of the second metal magnetic particles is $L_{01}$ and a perimeter other than an inside of the opening of the recessed portion of each of the second metal magnetic particles is Lc in the cross section of the magnetic portion, an average value of $L_{01}/(Lc+L_{01})$ is from 0.03 to 0.4.

16. The coil component according to claim 1, wherein where an area of a region inside the line segment that has the minimum distance between the distal ends at the opening of each of the second metal magnetic particles is $S_0$ and a cross-sectional area of each of the second metal magnetic particles having the recessed portion is Sc in the cross section of the magnetic portion, an average value of $S_0/(Sc+S_0)$ is from 0.05 to 0.8.

17. The coil component according to claim 1, wherein the magnetic portion further contains inorganic oxide particles.

18. The coil component according to claim 17, wherein in the cross section of the magnetic portion, at least part of at least one of the third metal magnetic particles and at least part of at least one of the inorganic oxide particles are in the recessed portion of at least one of the second metal magnetic particles.

19. The coil component according to claim 17, wherein the inorganic oxide particles are glass.

20. The coil component according to claim 17, wherein the inorganic oxide particles are ferrite.

* * * * *